No. 622,421. Patented Apr. 4, 1899.
E. L. FISSEL.
EXTENSION REEL FOR HARVESTERS.
(Application filed Nov. 4, 1898.)
(No Model.)
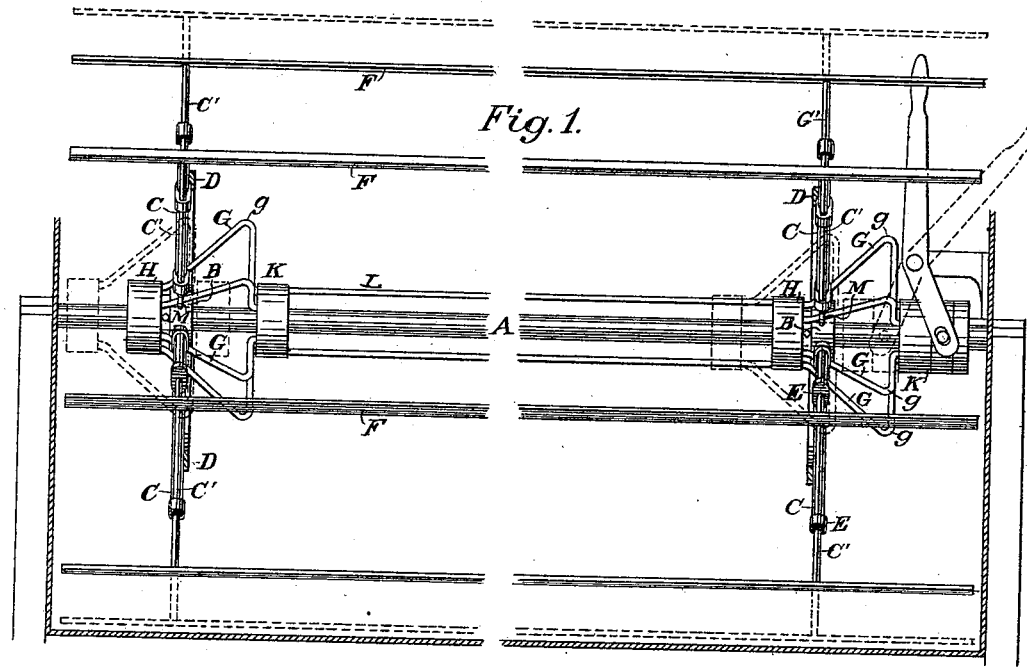
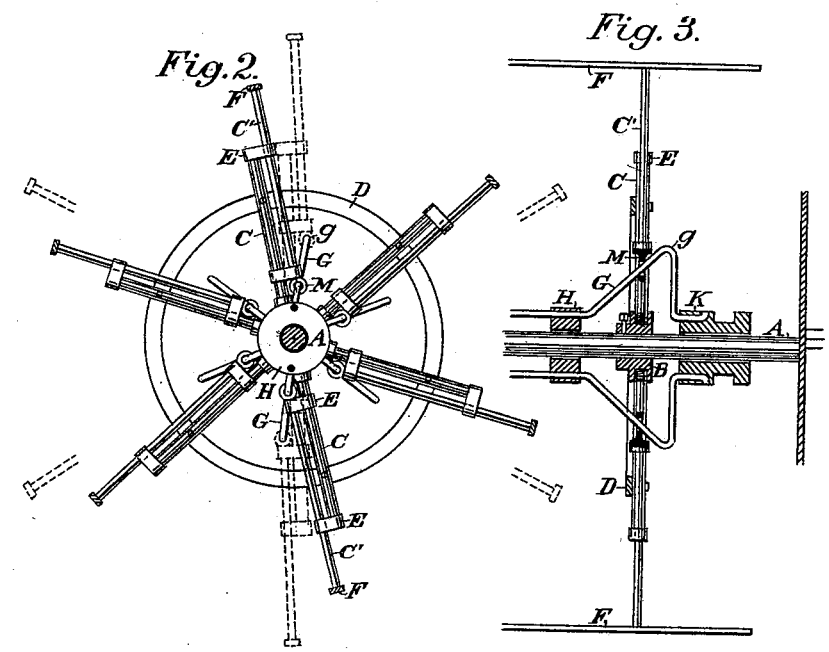
Witnesses,
Inventor,
Edward L. Fissel
By Dewey Strong & Co.
Attys

UNITED STATES PATENT OFFICE.

EDWARD L. FISSEL, OF DAVISVILLE, CALIFORNIA.

EXTENSION-REEL FOR HARVESTERS.

SPECIFICATION forming part of Letters Patent No. 622,421, dated April 4, 1899.

Application filed November 4, 1898. Serial No. 695,477. (No model.)

*To all whom it may concern:*

Be it known that I, EDWARD L. FISSEL, a citizen of the United States, residing at Davisville, county of Yolo, State of California, have invented an Improvement in Extension-Reels for Harvesters; and I hereby declare the following to be a full, clear, and exact description of the same.

My invention relates to a device which is especially adapted for use upon harvesters and machines for cutting grain and the like.

It consists in the parts and the constructions and combinations of parts hereinafter described and claimed.

Figure 1 is a longitudinal elevation. Fig. 2 is a transverse sectional elevation. Fig. 3 is a detail section.

Reels for harvesters are usually constructed with radial arms which support bars parallel or winding with relation to the reel-shaft, and they act to raise fallen or lodged grain and generally to sweep the grain toward the advancing sickle, so that the grain will be properly cut and deposited at the rear of the sickle.

The object of my invention is to provide a reel which is instantly adjustable to suit grain which may be lodged or otherwise in such condition as to need a change in the diameter of the reel.

A is the reel-shaft.

B B are hubs in which radial arms C are fixed, extending outwardly and suitably supported by circular rims D. To these arms C are fixed guides E, and through these guides the extension radial arms C' are slidable. Upon the outer ends of the arms C' are the reel-bars F, which serve to sweep the grain toward the sickle when the reel-shaft is revolved.

In order to lengthen or shorten the supplemental radial arms C' by sliding them outwardly or inwardly within the guides E, I have shown arms G, divergent from hubs H, which are slidable upon the shaft A. The ends of the arms G are fixed to these slidable hubs in any suitable or desired manner, and they diverge from the hubs to their greatest distance from the shaft, as at *g*. Thence turning sharply, the opposite ends are brought inwardly and connected with hubs K, which are also slidable in unison with the hubs H. The left-hand hub K is connected with the right-hand hub K by rods L, so that they all move in unison. The diverging portions of the rods G pass through loops M, which are made upon the inner ends of the extension radial arms C', and as these arms G extend all around the shaft A, one engaging each of the extension-arms, it will be seen that when the structure comprising the slidable hubs H K and the divergent arms G is pushed in one direction these arms will act to force the radial bars C' outwardly, and thus extend the reel-bars F correspondingly. When moved in the opposite direction, the parts will be retracted or drawn toward the center, thus correspondingly reducing the size of the reel. In order to effect this, one of the hubs K is grooved or channeled and is adapted to be engaged by a clutch-ring or equivalent device which is actuated by a lever extending to a point within reach of the operator of the machine, so that by this lever the structure comprising the hubs and angular bars G can be moved to instantly expand or contract the reel. Thus when lodged or heavy grain is encountered the reel may be placed in condition to operate upon such grain. When the grain becomes lighter or standing in proper condition, the reel may be again changed to suit the changed conditions.

Having thus described my invention, what I claim as new, and desire to secure by Letters Patent, is—

1. A harvester-reel comprising a central shaft, radial arms fixed thereto having guides supported upon them, supplemental arms slidable in the guides having reel-bars fixed to the outer ends, rods divergent in planes which intersect the longitudinal axis of the shaft, loops upon the inner ends of the movable radial arms which are engaged by the divergent rods, and means for moving said rods and their supports longitudinally upon the reel-shaft.

2. In a harvester-reel, a rotatable central shaft having radially-fixed extension-arms, rods bent so as to present inclined divergent portions corresponding with and engaging the extension-arms of the reel, hubs to which said rods are fixed and connected to move in unison, and levers or equivalent mechanism whereby the hubs and divergent rods are caused to slide upon the central shaft.

In witness whereof I have hereunto set my hand.

EDWARD L. FISSEL.

Witnesses:
W. H. SCOTT,
J. REITH, Jr.